United States Patent
Cohen

(10) Patent No.: US 6,594,710 B1
(45) Date of Patent: Jul. 15, 2003

(54) APPARATUS AND METHOD FOR A RANDOM ACCESS PERIPHERAL UNIT

(75) Inventor: Paul E. Cohen, San Jose, CA (US)

(73) Assignee: NEC Electronics, Inc., Santa Clara, CA (US)

(*) Notice: Subject to any disclaimer, the term of this patent is extended or adjusted under 35 U.S.C. 154(b) by 0 days.

(21) Appl. No.: 09/320,262

(22) Filed: May 26, 1999

(51) Int. Cl.$^7$ .............................. G06F 3/00; G06F 13/10
(52) U.S. Cl. .................. 710/3; 365/230.01; 365/230.05
(58) Field of Search .................... 710/3, 9, 12; 365/230, 365/230.01, 230.05, 230.08, 230.09; 711/200

(56) References Cited

U.S. PATENT DOCUMENTS

| | | | | |
|---|---|---|---|---|
| 4,893,279 A | * | 1/1990 | Rahman et al. | 365/230.03 |
| 4,989,113 A | * | 1/1991 | Holl, Jr et al. | 710/22 |
| 5,440,705 A | * | 8/1995 | Wang et al. | 711/220 |
| 5,530,901 A | * | 6/1996 | Nitta | 710/22 |
| 5,721,947 A | * | 2/1998 | Priem et al. | 710/107 |
| 5,924,126 A | * | 7/1999 | Rosenthal et al. | 711/207 |
| 5,956,494 A | * | 9/1999 | Girardeau, Jr. et al. | 712/209 |
| 6,052,766 A | * | 4/2000 | Betker et al. | 711/200 |
| 6,128,733 A | * | 10/2000 | Miyaguchi et al. | 713/2 |
| 6,260,098 B1 | * | 7/2001 | Ku | 710/130 |

* cited by examiner

Primary Examiner—Thomas Lee
Assistant Examiner—Thuan Du
(74) Attorney, Agent, or Firm—Campbell Stephenson Ascolese LLP

(57) ABSTRACT

In a data processing system, the ability to provide indirect addressing capability is implemented by providing a peripheral system having a first memory unit, second memory unit, and a control unit. In a first embodiment of the invention, a first address signal applied to the control unit accesses a first location in the first memory unit. The signal group stored in the first location is a first address signal group. The first signal group is used by the control unit to access a second location in the second memory unit. The access of the second location can be used to store a data signal group therein in a write operation or can be used to retrieve a data signal group therefrom in a read operation. In the second embodiment of the invention, the control unit includes a pointer unit responsive to a plurality of control address signal groups. The control address signal groups cause the storage or retrieval of data signal groups in a data register in the control unit. The address signal group in the address register can be stored therein by an associated processing unit. The control address signal groups also determine a next address in an address register. The control unit uses the address signal group in the address register to determine an address signal group in a first location in the first memory unit. The address signal group in the first location is used to access a second location in the second memory unit. This access of the second location permits data signal groups to be transferred from the data register in the control unit to the second location or data signal groups to be transferred from the second location to the data register.

37 Claims, 4 Drawing Sheets

APPARATUS AND METHOD FOR A RANDOM ACCESS PERIPHERAL UNIT

BACKGROUND OF THE INVENTION

1. Field of the Invention

The invention relates generally to data processing systems and, more particularly, to the storage and retrieval of information within a data processing system.

2. Description of the Related Art

The general purpose microprocessor has continued its phenomenal growth both in functionality and in popularity. However, many applications exist wherein the functionality and flexibility of the microprocessor instruction set can compromise the performance of the general purpose microprocessor. Consequently, a group of limited instruction set microprocessors, typically referred to as digital signal processors (DSP), has been developed. Digital signal processors have also seen a greatly expanded market as new applications have been identified and new architectures have been developed.

A typical data processing system 10 using a digital signal processor 11 for the actual processing of data is shown in FIG. 1. The digital signal processor 11 receives input signals, processes these signals, and transmits the processed signals as output signals. Coupled to the digital signal processor 11 is an X memory array 12 and a Y memory array 14. The X memory array 12, and the Y memory array 14, can include a memory unit 25 and can include one or more peripheral units 22. The memory unit 25 can be a conventional memory unit, while the peripheral unit 22 can be a conventional memory unit or can have a different functionality. Typically, the memory unit 25 includes a read-only-memory (ROM) portion 252 and a random-access-memory (RAM) portion 254. The ROM memory portion 252 can be used to store signal groups that will not be subject to change, while the RAM memory portion 254 is used to store data signal groups that have been or can be processed. By way of specific example, the input signals to the digital signal processor 11 can be encoded communication signals. The communication signals can be decoded by the digital signal processor 11, the X or Y memory unit storing intermediate and final results until transmission of the decoded signals. As will be clear to those acquainted with the processing of communication signals, the encoding and decoding of signals in a communication system can be computation-intensive and can require a large amount of memory. Similarly, the processing of speech, whether as part of a communication system or for other purposes, is also computation-intensive. These applications are typical of the processing activity to which digital signal processors have been advantageously applied.

However, while the restricted instruction set has been one of the keys to the high computational performance of the digital signal processors, this restricted instruction set has resulted in some limitations. For example, some of the techniques that are particularly convenient for programmers in the operation of the general purpose microprocessor are not available in the digital signal processors. These techniques can be used to conserve memory use and/or can be used to accelerate computations. Some of the techniques that are typically not as efficient in a digital signal processor are bit-field operations, stacks, and indirect addressing.

With respect to indirect addressing specifically, this technique involves identifying a final address location by the contents of an intermediate address location, i.e., the intermediate location being directly addressed and the final address being indirectly accessed through the contents of the intermediate address location. A need has therefore been felt for apparatus and method having the feature that an operation equivalent to indirect addressing can be achieved in a digital signal processor environment. A need has also been felt for an additional feature in a digital signal processor environment that is the operational equivalent to indirect addressing would not require additional functionality in the digital signal processor itself. A need has further been felt for a technique in the digital signal processor environment having the feature that the indirect addressing is implemented without alteration of the digital signal processor itself. A need has been also been felt for a technique in the digital signal environment for providing for sequential addressing of memory locations that can operate independently of the operation of the digital signal processor.

SUMMARY OF THE INVENTION

The aforementioned and other features are accomplished, according to the present invention, by providing a random access peripheral unit having a ROM memory, a control unit, and dual-port RAM memory. The digital signal processor transmits an address signal group to the X (or Y) memory unit. The address signal group is entered into the control unit. The control unit applies a portion of the address signal group to the ROM memory. The address signal group accesses a location in the ROM memory. The accessed (indirect) address memory location stores an address signal group that can be used by the control unit to access a location in the RAM memory. In this manner, a location in the RAM memory can be accessed for reading or writing of information. In addition, locations in the RAM memory can be accessed directly by the digital signal processing unit. In a second embodiment of the present invention, the control unit includes a pointer register and associated registers that permit the accessing of a sequence of locations in the RAM memory. In either embodiment, a storage location in a memory unit can be accessed by an address that does not correspond to the physical address of the storage location. And in either embodiment, the contents of the dual-port RAM memory can be accessed either through the control unit or can be accessed directly by the processing unit.

BRIEF DESCRIPTION OF THE DRAWINGS

The present invention may be better understood, and its numerous objects, features, and advantages made apparent to those skilled in the art by referencing the accompanying drawings.

FIG. 2A is a block diagram of a first embodiment of a data processing system with a digital signal processor having the capability of indirect addressing, while

The use of the same reference symbols in different drawings indicates similar or identical items.

DESCRIPTION OF THE PREFERRED EMBODIMENT(S)

Figure 1:
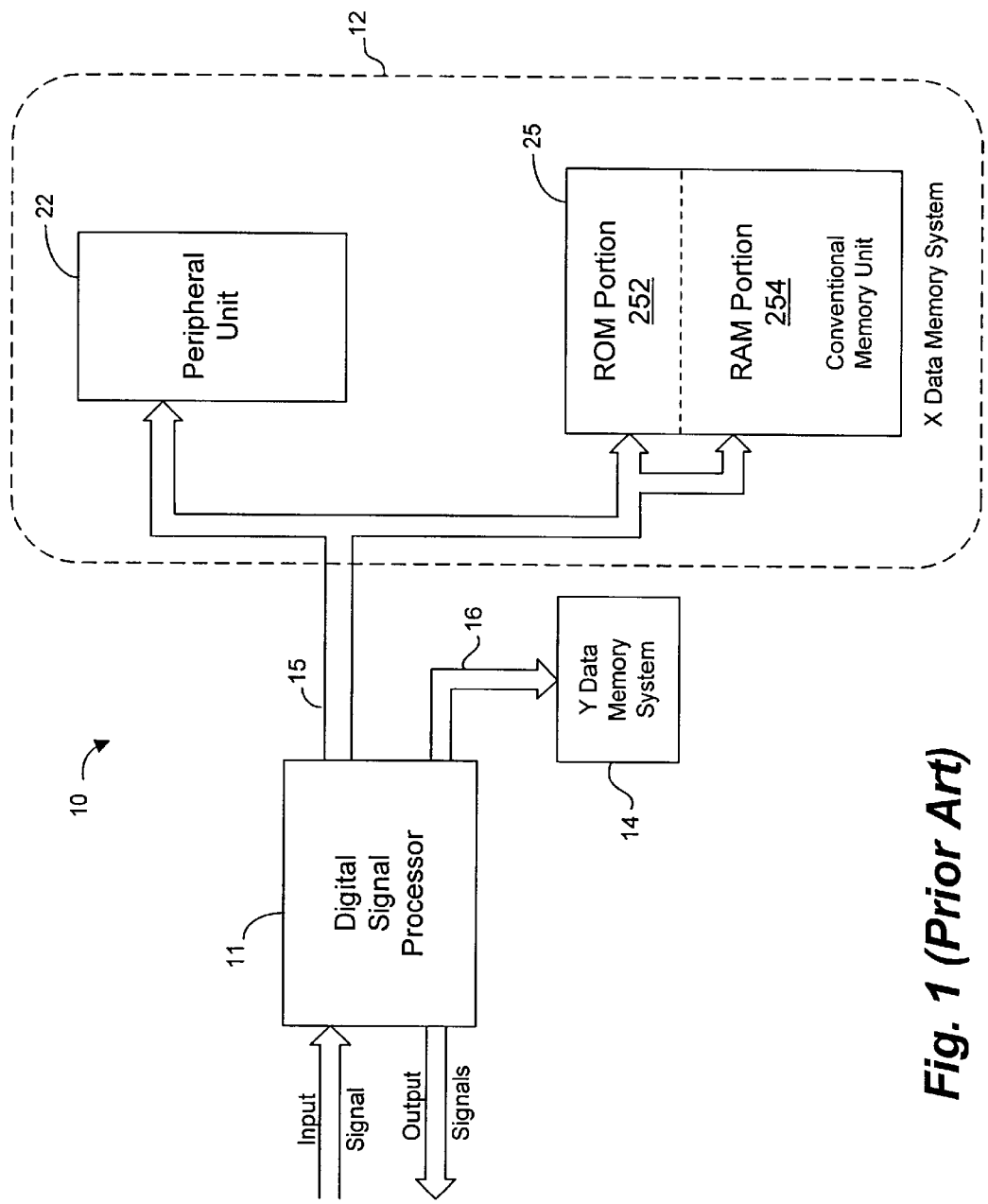
FIG. 1 is a block diagram of a data processing system having a data signal processor according to the prior art.

FIG. 1 has been described in relationship to the prior art.

Figure 2A:
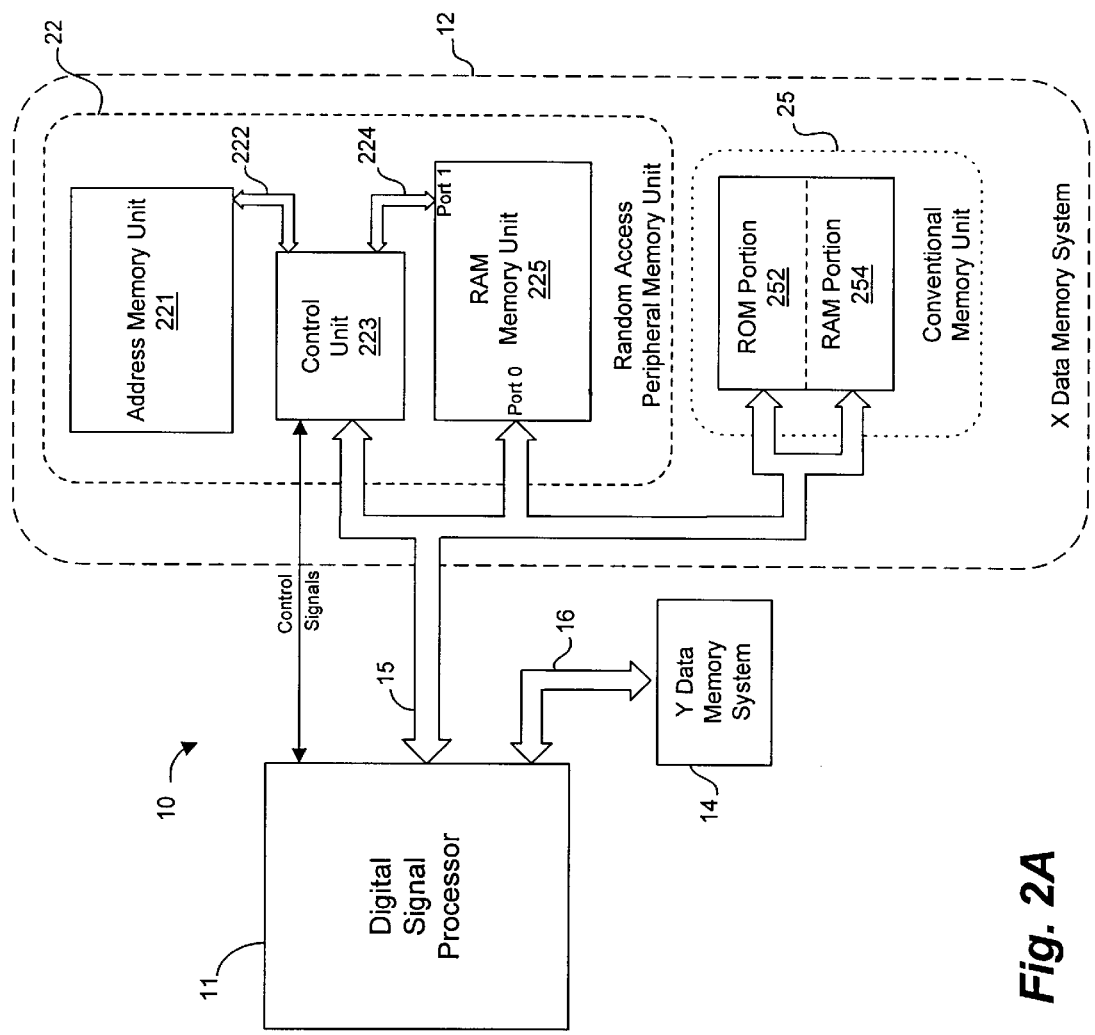

Referring now to FIG. 2A, a block diagram of a data processing system 10, implemented with a data signal processor 11, is shown along with apparatus providing for indirect addressing of memory locations. In addition to the digital signal processor 11, the data processing system 10 can include an X data memory system 12, Y data memory system ]not shown[ 14, and an instruction memory system, not shown. The digital signal processing unit 11 is coupled to the X data memory system by address and data bus 15 is coupled to the Y data memory system by address and data bus 16. The X data memory system 12 includes a conventional memory unit 25 and a random access peripheral memory unit 22. The conventional memory unit has a ROM portion 252 and a RAM portion 254. In general, the ROM portion 252 stores signal groups used in the operation of the digital signal processor that are not subject to alteration, while the RAM portion generally stores data signal groups used in the operation and data signal groups resulting from the operation of the digital signal processor 11. The address and data bus 15 couples the digital signal processor to both the ROM portion 252 and the RAM portion 254 of the conventional memory 25. As will be clear to those skilled in the art of digital signal processing, this description is a generalization. Signal groups of any characterization can be stored in either the ROM of the RAM memory portions. Furthermore, the use of the designations ROM and RAM memory portion is not meant to limit these portions to any particular technology.

The random access peripheral memory unit 22 includes an address memory unit 221, a control unit 223, and a RAM memory unit 225, the RAM memory unit 225 having two ports, a port 0 and a port 1. The address and data bus 15 is coupled to the digital signal processor 11, to the control unit 223 and the RAM memory unit 225. In 10 addition, the control unit 223 is coupled to the address memory unit 221 by an address and data bus 222, and the control unit 223 is coupled to port 1 of the RAM memory unit 225. Also illustrated in FIG. 2A (as well a FIG. 2B and FIG. 3) is the exchange of control signals between the digital signal processor 11 and the control unit 223. The control signals determine the activity to be performed by peripheral unit 22 and coordinate the exchange of address and data signal groups between the control unit 223 and the digital signal processor 11. These signals include timing signals, read/write signals, acknowledge signals, etc.

Figure 2B:
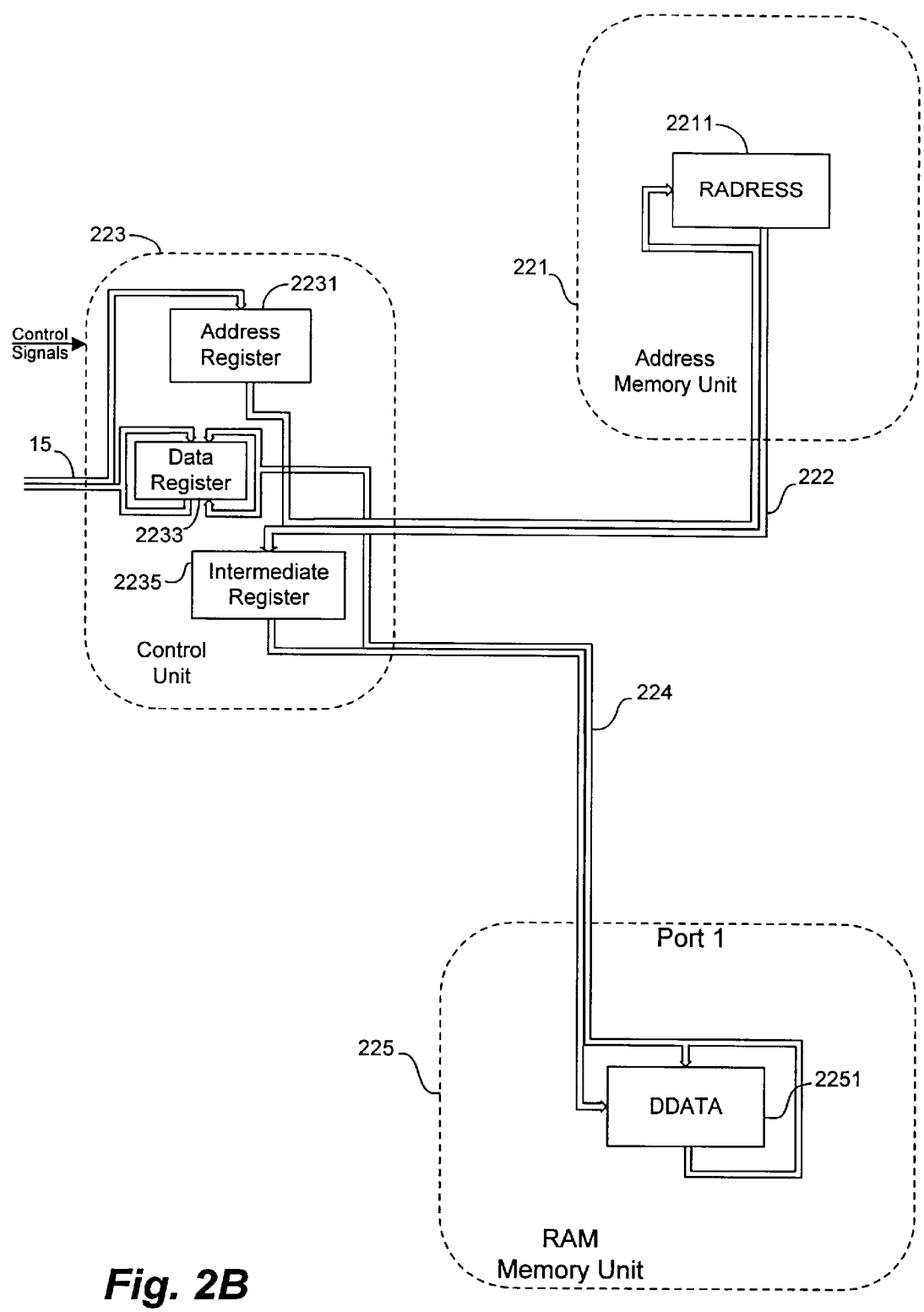
FIG. 2B illustrates the apparatus by which a specified RAM memory location is accessed according to the first embodiment of the present invention.

Referring to FIGS. 2A and 2B, the apparatus and operation of one embodiment of the present invention is illustrated. The digital signal processor 11 is directly coupled to and can exchange data signal groups with the ROM portion 252, the RAM portion 254, and the port 0 of RAM memory unit 225 in the conventional manner. However, according to the present invention, the designated data signal group DDATA can be retrieved (read) from the memory unit 225 in a second fashion. The digital signal processor 11 generates an address signal group IADDRESS (i.e., intermediate address signal group) identifying the DDATA signal group. The IADDRESS signal group is transmitted on address and data bus 15 and is entered in the address register 2231 of control unit 223. The control unit 223 applies the IADDRESS signal group in the address register 2231 to the address memory unit 221 by address and data bus 222. As a result of the application of the IADDRESS signal group to the address memory unit 221, an address memory location 2211 is accessed. As a result of this access, the data signal group RADDRESS stored in the location 2211 is retrieved and transferred to intermediate register 2235 in the control unit 223. The control unit 223 then applies the RADDRESS signal group stored in intermediate register 2235 to port 1 of RAM memory unit 225 by means of address and data bus 224. As a result of the application of the RADDRESS signal group to RAM memory unit 225, location 2251 in RAM memory unit is accessed and the signal group DDATA stored therein is retrieved from the location 2251 and transferred by means of address and data bus 224 to the data register 2233 in the control unit 223. The DDATA signal group stored in data register 2233 can then be transferred to the digital signal processor 11 by address and data bus 15, thereby completing the retrieval of the DDATA signal group.

While the foregoing description dealt with the retrieval of the DDATA signal group from location 2251 the RAM memory unit, the same apparatus can be used for the storing (writing) of the DDATA signal group into same location. In this procedure, the DDATA signal group is entered into the data register 2233 of the control unit 223 when the IADDRESS signal group is entered in the address register 2231 of the control unit 223. After retrieval of the RADDRESS signal group, the RADDRESS signal group and the DDATA signal group are applied to port 1 of the RAM memory unit. When the RADDRESS signal group accesses the location 2251 of the RAM memory unit 225, the DDATA signal group is stored therein, thereby completing the storage of the DDATA signal group into the indirectly addressed RAM memory unit.

Figure 3:
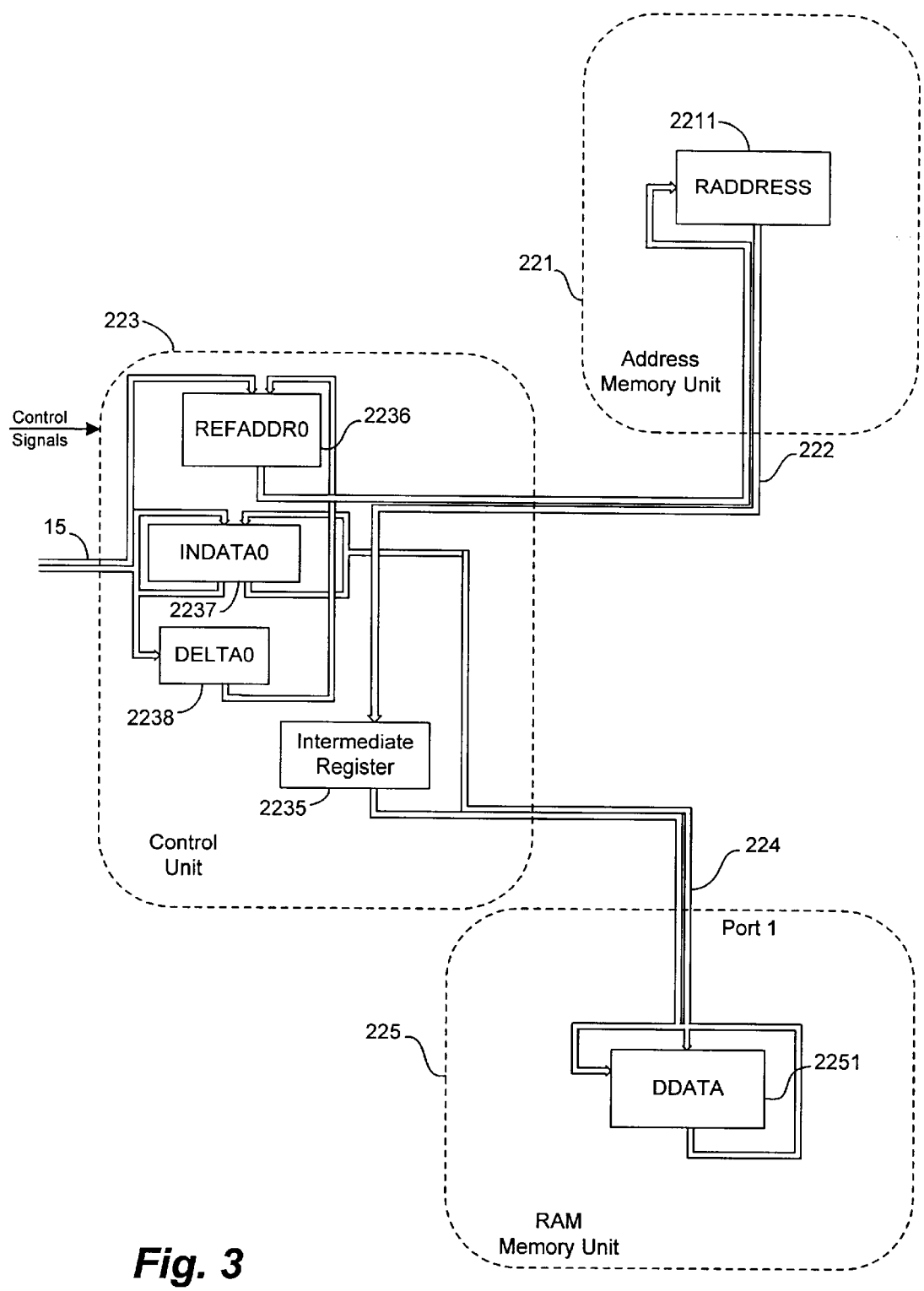
FIG. 3 is a block diagram of a second embodiment of the present invention illustrating the features by which the second embodiment differs from the first embodiment.

Referring now to FIG. 3, a second embodiment of the present invention is shown. The second embodiment of the present invention further includes all elements of the data processing system shown in FIG. 2A. However, in this embodiment control unit 223 has been altered and provides a pointer system. The pointer system of the preferred embodiment is implemented to include at least one group of three specialized registers. These registers are labeled REFADDR0 (reference address 0) 2236, INDATA0 (Indirect Data 0) 2237, and DELTA0 (incremental change 0) 2238. In addition, the digital system processing unit is adapted to respond to five address signal groups, INDATA0-##, INDATA0--, INDATA0, INDATA0++, and INDATA0##. These address signal groups all access the DELTA0 register. In addition, these address signal groups effect a change in the address signal group stored in the REFADDR0 register 2236 shown in Table 1.

TABLE 1

| Signal Group | Adjustment to Address Signal Group |
| --- | --- |
| INDATA0-## | REFADDR0 = (REFADDR0 − DELTA0) |
| INDATA0-- | REFADDR0 = (REFADDR0 − 1) |
| INDATA0 | REFADDR0 is unchanged |
| INDATA0++ | REFADDR0 = (REFADDR0 + 1) |
| INDATA0## | REFADDR0 = (REFADDR0 + DELTA0) |

Due to time constraints, the system provides for prefetching of the data signal groups in preparation for a read operation and for prefetching of address signal groups in preparation for write operations. In particular, whenever the contents of the REFADDR0 register 2236 changes, the following sequence of events always occurs in order to prefetch the appropriate signal groups into INDATA0 register 2237 and intermediate register 2235. The control unit 223 applies the address signal group in the REFADDR0 register 2236 to the address memory unit 221 to obtain the RADDRESS signal group in the addressed location 2211. The RADDRESS signal group is applied through the intermediate register 2235 in the control unit 223 to port 1 of the RAM memory unit 225. The data signal group at the location 2251 accessed by the RADDRESS signal group is then transferred to the INDATA0 register 2237.

When the digital signal processor 11 writes an address signal group into the REFADDR0 register 2236, then the data in the REFADDR0 register 2236 changes and so the sequence of events described above occurs to update INDATA0 register 2237 and intermediate register 2235.

When the digital signal processor reads a data signal group from any of the address signal groups INDATA0-##, INDATA0--, INDATA0, INDATA0++or INDATA0##, the control unit returns the data signal group in the INDATA0 register 2237 to the digital signal processor 11. Simultaneously, the signal group in the REFADDR0 register 2236 is updated to a new value given in Table 1. Except in the case of the third address signal group, INDATA0, the data in the REFADDR0 register 2236 is altered and so the sequence of the events described above occurs to update the INDATA0 register 2237 and the intermediate register 2235.

When the digital signal processor writes a data signal group to any of the address signal groups INDATA0-##, INDATA0--, INDATA0, INDATA0++, or INDATA0##, the control unit 223 writes the data signal group from the digital signal processor data bus to the RAM memory unit 225 at the address provided by the intermediate register 2235. Simultaneously, the signal group in the REFADDR0 register 2236 is updated to the new value shown in Table 1. Except in the case of the third signal group, INDATA0, the data in the REFADDR0 register 2236 is altered and so the sequence of events described above occurs to update INDATA0 register 2237 and intermediate register 2235.

The configuration of the control unit 223 shown in FIG. 3 permits the sequential addressing of locations in the RAM memory unit 225. Consequently, the digital signal processor 11 can then either directly address a sequence of locations in the RAM memory unit, or in the alternative, can use the indirect addressing to address locations in RAM memory unit 225 in a sequential manner through the operation of the control unit 223. When the direct addressing is used, unless the addressed locations addressed are already in sequential order, each location address must be computed for each memory access. Using the indirect addressing procedure involving the control unit 223, the sequential addresses are provided as a result of the storage of the appropriate addresses in the address memory unit 221.

As will be clear, the foregoing description has been provided in such a manner as to illustrate clearly the operation of the invention. In some implementations, some of the registers may be omitted. For example, the RADDRESS signal group retrieved from the address memory register 221, can be applied directly to port 1 of the RAM memory unit 225. In this implementation, the intermediate register can eliminated. (The elimination of the intermediate register would, however, result in slower write operations.) Furthermore, the apparatus by which data signal groups are entered into or retrieved from a memory location have been omitted. In addition, in the preferred embodiment, the address memory unit is a ROM memory and address signal groups can be stored therein prior to any operation of the device. When control of the contents of the address memory unit during the data processing operation is desired, the address memory unit 221 can be implemented with an alterable-memory technology, e.g., RAM technology, flash ROM technology, etc. The ability to alter the contents of the address memory unit 221, while requiring apparatus not described herein, would be understood by those skilled in the art and is within the scope of the present invention.

As will be clear to those skilled in the art of data processing system design, the set of registers REFADDR0 register 2236, INDATA0 register 2237, and DELTA0 registers 2238 can be the first of a set of registers (i.e., only the 0th set being shown in the FIG. 3), each set of registers performing, for example, a increment or decrement other than ## of the 0th set of registers. As will also be clear to those skilled in the art, an interface unit, also not shown, controls the exchange of signals from the plurality of sets of registers to the address/data bus 15.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims. As a specific example, the present random access peripheral unit has been described with particular reference to use with a digital signal processor. However, the random access peripheral unit may be used advantageously with other types of processing units, including processing units without the indirect addressing capability.

What is claimed is:

1. A peripheral unit, comprising:
   a control unit, the control unit receiving address signal groups, the control unit receiving and applying data signal groups;
   a first memory unit comprising a plurality of memory locations each one of which is accessible by a distinct address signal group, the first memory unit accessing a first memory location thereof determined by a first address signal group from the control unit, the first memory unit storing a second address signal group; and
   a second memory unit, the second memory unit storing data signal groups, the second memory unit responsive to the control unit for accessing a second location determined by the second address signal group stored in the first memory location, wherein the second memory unit is a dual port memory, wherein the control unit stores a data signal group in the second location or retrieves the data signal group from the second location via a second port of the second memory unit, wherein the peripheral unit is coupled to a processing unit via a first port of the second memory unit.

2. The peripheral unit as recited in claim 1 wherein the control unit is responsive to a control address signal group; the control unit including:
   an address register, the address register storing the first address signal group identifying the first memory location; and
   a data register, wherein the control address signal group accesses the data register, the control address signal group determining a next first address signal group stored in the address register.

3. The peripheral unit as recited in claim 2, wherein the control unit includes a change register, the control address signal group determining the next first address signal group by combining the first address signal group in the address register with a signal group in the change register.

4. The peripheral unit as recited in claim 3, wherein the processing unit can store a selected first address signal group in the address register.

5. The peripheral unit as recited in claim 1, the second memory unit exchanging data groups through a first port, the second memory unit exchanging data signal groups with the control unit through a second port.

6. The peripheral unit as recited in claim 1, wherein the first memory unit is a read-only-memory unit.

7. A method for providing indirect addressing of a selected memory location in a peripheral unit, the method comprising:

applying a first address signal group to the peripheral unit;

in the peripheral unit, using the first address signal group to access a first memory location of a first memory unit having a plurality of memory locations each one of which is accessible by a distinct address signal group, the first memory location storing a second address signal group;

using the second address signal group to access a second memory location of a second memory unit, the second memory location being the selected memory location; and providing access of the second memory location to a control unit via a first port of the second memory unit and to a data processing unit via a second port of the second memory unit.

8. The method as recited in claim 7 further comprising:

applying the first address signal group to a control unit;

accessing the first memory location in the first memory unit with the control unit; and accessing the second memory location in a second memory unit.

9. The method as recited in claim 8 further comprising:

applying a control address signal group to the control unit, the control address signal group providing an access to a data register in the control unit, application of the control address signal group resulting in access of selected second memory determined by an address signal group in an address register in the control unit, application of the control address resulting in an update of the address signal group in the address register.

10. The method as recited in claim 9, wherein applying the control address signal group includes:

updating the address signal group in the address register by combining the address signal group with a signal group determined by a signal group in a change register.

11. The method as recited in claim 10, the method further including:

assigning first locations to a first memory unit; and
assigning second locations to a second memory unit.

12. The method as recited in claim 11, the method further including:

accessing first and second memory locations by the control unit via the first port; and accessing second memory locations by a coupled processing unit via the second port.

13. For use with a processing unit, a peripheral unit coupled to the processing unit, the peripheral unit comprising:

a control unit coupled to the processing unit;

a first memory unit coupled to the control unit, wherein the first memory unit comprises a plurality of memory locations each one of which is accessible by a distinct address signal group;

a second memory having a first port coupled to the processing unit and having a second port coupled to the control unit, wherein the processing unit can directly access a selected location in the second memory; wherein the processing unit can indirectly access the selected location in the second memory unit by the control unit.

14. The peripheral unit as recited in claim 13, wherein the control unit, in response to a first address signal group from the processing unit, retrieves a second address signal group from the first memory unit; the control unit using the second address to access the selected location.

15. The peripheral unit as recited in claim 14, the control unit including:

an address register storing an address signal group identifying a location in the first memory unit, the address signal group in the address register accessing the location in the first memory unit in response to a control address signal group from the processing unit, wherein the address signal group in the address register is updated in response to the control address signal group; and a data register storing data signal groups, the processing unit accessing the data register in response to the control address signal group.

16. The peripheral unit as recited in claim 15 wherein the control unit further includes a change register, the updating of the address signal group in the address register being determined by the contents of the change register.

17. The peripheral unit as recited in claim 16, wherein the processing unit can store an address signal group in the address register.

18. The peripheral unit as recited in claim 13 wherein the first memory unit is read-only-memory unit and the second memory unit is a random-access-memory unit.

19. For use with processing unit, a peripheral unit coupled to the processing unit, the peripheral unit comprising:

a control unit coupled to the processing unit;

a first memory unit coupled to the control unit;

a second memory having a first port coupled to the processing unit and having a second port coupled to the control unit, wherein the processing unit can directly access a selected location in the second memory; wherein the processing unit can indirectly access a selected location in the second memory unit by the control unit;

wherein memory locations in the first memory unit can be changed by the processing unit.

20. A method for accessing a group of locations in a first memory unit in a first sequence, the group of locations in the first memory unit having non-sequential addresses, the method comprising:

in an address memory unit having group of intermediate memory locations capable of being addressed in a second sequence, storing addresses of the group of nonsequential locations sequentially in the second sequence of intermediate memory locations;

accessing sequentially the second sequence of intermediate memory locations;

using the addresses in the second sequence of intermediate memory locations to access sequentially the group of locations in the first memory unit via a first port of the first memory unit; and providing access of the group of locations in the first memory unit to a data processing unit via a second port of the first memory unit.

21. The method as recited claim 20, wherein a control unit is coupled to the first and second memory, the control unit including an address register and a data register, the method further comprising:
    accessing a location in the second memory determined by a signal group in the address register;
    accessing a location in the first memory determined by a signal group in the accessed second memory location; and
    exchanging data signal groups between the data register and the accessed location in the first memory.

22. The method as recited in claim 21, the method further comprising:
    exchanging a data signal group between the data register and a processor in response to a predetermined signal group; and
    updating an address signal group in the address register to an address of a next sequential location in the second memory in response to the predetermined signal group.

23. The method as recited in claim 22, wherein the control unit includes a change register, the updating step further including the step of updating the address register based on the contents of address register and the change register.

24. The method as recited in claim 23, wherein the predetermined signal group includes an address of the data register.

25. A data processing system comprising:
    a processor; and
    a peripheral unit for exchanging signal groups with the processor, the peripheral unit comprising:
        a dual port memory unit comprising first and second ports, for storing data signal groups in random locations; and
        a control unit coupled to the processor and to the dual port memory unit, the control unit having a second memory, the second memory storing address signal groups identifying locations in the dual port memory unit, wherein the processor is coupled to the dual port memory unit via the first port, wherein the control unit is coupled to the dual port memory unit via the second port, and wherein the processor can retrieve data signal groups in the dual port memory via the first port by accessing locations in the second memory.

26. The data processing system as recited in claim 25, wherein the control unit can access a random group of locations in the dual port memory in a preselected sequence.

27. The data processing system as recited in claim 26, wherein the accessing of the random group of memory locations in the preselected sequence is provided by a series of predetermined control address signal groups applied by the processor to the control unit.

28. The data processing system as recited in claim 27, wherein the control unit further includes:
    an address register, the address register determining the location in the second memory unit to be accessed; and
    a data register, the data register exchanging data signal groups with the processor, the data register exchanging data signal groups with an accessed memory location in the dual port memory unit.

29. The data processing system as recited in claim 28, wherein the predetermined control address signal group results in a exchange of data signal groups between the processor and the data register, the predetermined control address signal group resulting in the address signal group in the address register being updated to an address signal group identifying a next sequential location in the second memory unit.

30. The data processing system as recited in claim 29, the control unit further including at least one change register, the change register determined the updating of the address register in response to the predetermined control address signal group.

31. The data processing system as recited in claim 30, the predetermined signal group being selected from a plurality of change signal groups, each change signal group determining a different updating of address signal group in the address register.

32. The data processing system as recited in claim 31, wherein the control unit includes a plurality of change registers, wherein each change register has stored therein an associated change signal group.

33. The data processing system as recited in claim 32, wherein the processor is a digital signal processor.

34. A method of exchanging data signal groups between a peripheral unit and a processing unit, the method comprising:
    applying an input address signal group to an address register in the peripheral unit;
    retrieving an intermediate address signal group from a first memory unit at a location determined by the input address signal group and storing the intermediate address signal group in an intermediate register;
    retrieving a stored data signal group from a first port of a second memory unit at a location determined-by the intermediate address signal group and storing the data signal group in a data register;
    providing access of stored data signal group in the first memory unit to a data processing unit via a second port of the first memory unit;
    when a read operation is performed:
        transferring the stored data signal group to the processing unit;
        updating the input address signal group to an updated input address signal group;
        retrieving an updated intermediate address signal group from the first memory unit at a location determined by the updated input address signal group and storing the updated intermediate address signal group in the intermediate register; and
        retrieving an updated stored data signal group from the second memory unit an a location determined by the updated intermediate address signal group and storing the updated stored data signal group in the data register; and
    when a write operation is performed:
        storing a signal group from the processing unit in the second memory location identified by the intermediate address signal group in the intermediate register;
        updating the input address signal group to an updated input address signal group;
        retrieving an updated intermediate address signal group from the first memory unit at a location determined by the updated input address signal group and storing the updated intermediate address signal group in the retrieve intermediate register; and
        retrieving an updated stored data signal group from the second memory unit an a location determined by the updated intermediate address signal group and storing the updated stored data signal group in the data register.

35. The method of claim 34 wherein the updated input address signal group is determined by a one of plurality of control address signal groups applied to the peripheral unit.

36. The method of claim 35 wherein intermediate address signal groups are chosen to provide a preselected sequence of locations in the second memory unit.

37. A peripheral unit comprising:

a control unit for receiving addresses and data;

a first memory unit comprising addressable memory locations for storing data, wherein a first memory location of the first memory unit can be accessed using a first address received by the control unit, and wherein the first memory location is configured to store a second address; and a dual port memory unit for storing data, wherein the dual port memory unit comprises a second memory location that can be accessed using the second address, wherein the control unit can store data in the second memory location or read data from the second memory location via a second port of the dual port memory unit, and wherein a processing unit can store data in the second memory location or read data from the second memory location via a first port of the dual port memory unit.

* * * * *